May 13, 1958  C. C. BOESEWETTER  2,834,588
BORING TYPE MINING MACHINE HAVING FOUR BORING HEADS
Filed Feb. 24, 1956  3 Sheets-Sheet 1
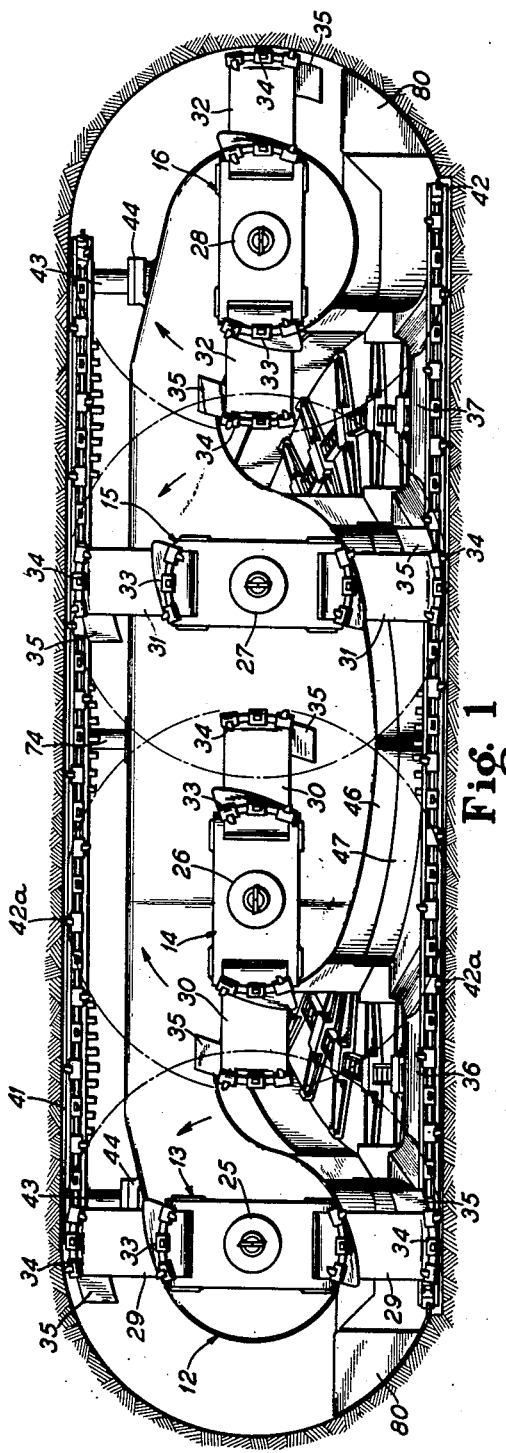
INVENTOR.
Chester C. Boesewetter
BY
Murray A. Gleeson
ATTORNEY

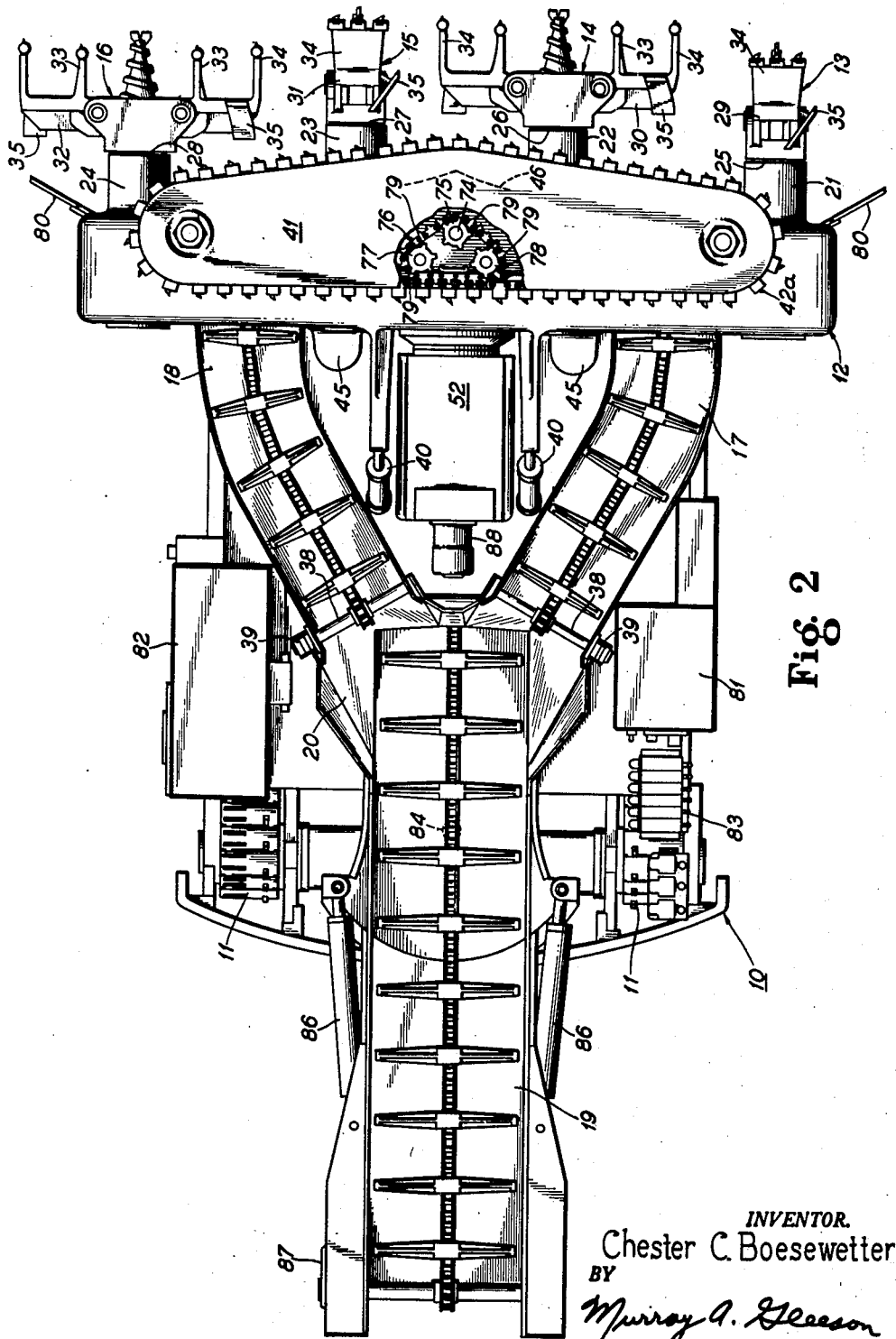

May 13, 1958   C. C. BOESEWETTER   2,834,588
BORING TYPE MINING MACHINE HAVING FOUR BORING HEADS
Filed Feb. 24, 1956   3 Sheets-Sheet 3

INVENTOR.
Chester C. Boesewetter
BY
Murray T. Gleeson
ATTORNEY

United States Patent Office 2,834,588
Patented May 13, 1958

2,834,588
BORING TYPE MINING MACHINE HAVING FOUR BORING HEADS

Chester C. Boesewetter, Erie, Pa., assignor to Goodman Manufacturing Company, Chicago, Ill., a corporation of Illinois Application February 24, 1956, Serial No. 567,547

1 Claim. (Cl. 262—7)

This invention relates to improvements in mining machines of the multiple boring type characterized by having a plurality of boring heads mounted in the front of the machine frame for advancing the machine into a working face.

Heretofore, it has been common practice with such machines to utilize two boring heads in side-by-side relation, with the cutter arms of the two boring heads in mutually overlapping paths at the center of the machine, and rotating in opposite directions. The cutter arms also have scoops at their outer ends for sweeping the cuttings inwardly toward the throat of a discharge conveyor at the center of the machine. It has been found, however, that there are certain limitations in efficiency of operation when machines of this type are to be used in relatively low veins of coal or other mineral, as for instance when the diameter of the boring heads is less, say, than about five feet. In such case, the cutting width of the machine must be correspondingly reduced so as to be too narrow for practical purposes.

In a somewhat different type of boring machine, three, four or more boring heads are arranged in horizontal alignment, but this seriously complicates the problem of removing the output of the machine, if two boring heads on each side of the central conveyor or throat are to rotate in opposite directions and in overlapping or closely contiguous paths, because each such boring head can then have only one cutter arm instead of two, in order to avoid interference between adjacent boring heads. This correspondingly limits the total number of scoops to one for each head, and handicaps the transfer of the output of loose material toward the central conveyor throat, particularly from the outermost cutter heads.

One of the objects of the present invention is to provide an improved structure and arrangement for multiple head boring machines, wherein the machine has two conveyor throats, each disposed adjacent to an outermost boring head, whereby said outermost boring heads may rotate in directions such that each of their outer extremities moves, adjacent the floor, in a direction toward a corresponding one of the conveyor throats, and with each cutter arm of each boring head provided with a scoop for transferring loose material to the throat.

Other objects of the invention will appear as the following description proceeds.

The invention may best be understood by reference to the accompanying drawings, in which:

Figure 1 is a front view of a boring machine constructed in accordance with the invention.

Figure 2 is a top plan view of the machine shown in Figure 1, with parts broken away to show details of the auxiliary trimmer chain drive.

Figure 3 is a diagram of the drive gearing for the four cutter heads and the trimmer chains.

Figure 4:
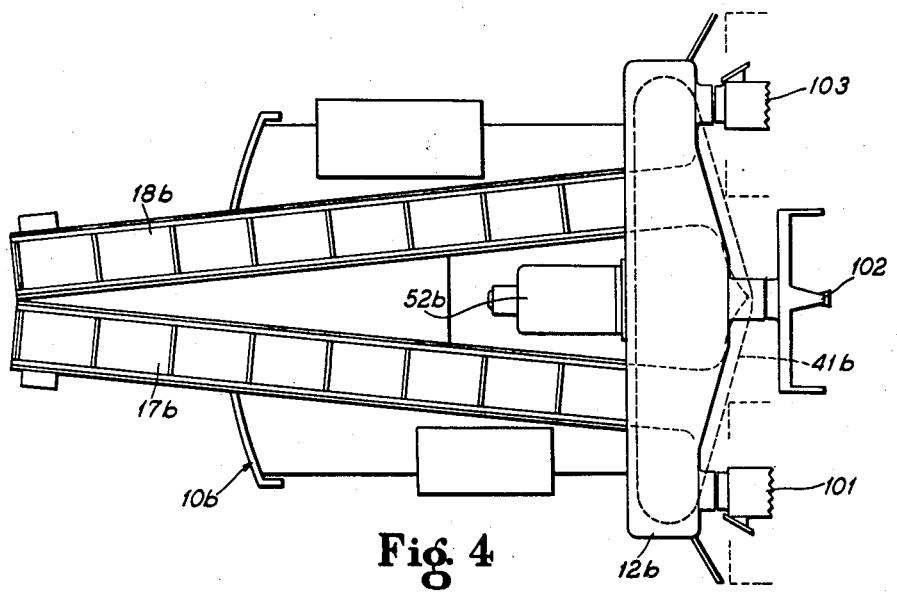
Figure 4 is a top plan view of an alternate form of a machine constructed in accordance with the invention.

Referring now to details of the embodiment of the invention shown in the drawings, the numeral 10 indicates generally a mobile frame of a form used on multiple boring head type mining machines, mounted on crawler treads 11 and having customary auxiliary equipment such as housings for electrical components 81 and 82 and a cluster of controls 83. By the present invention there is provided an auxiliary boring head supporting frame 12 having a plurality of heads, in this case four designated 13, 14, 15 and 16. The main frame 10 thus accommodates two branch conveyors 17 and 18, both feeding upon a central conveyor 19 pivotal about a point 84, having swing jacks 86, 86 and a conveyor chain drive 87. Conveyor 19 extends rearwardly from a receiving hopper 20 intermediate the ends of the main frame, instead of extending forwardly into material-receiving position at the front end of the machine, as in some conventional two-head boring machines.

The auxiliary frame 12 may be mounted on the main frame for vertical and tilting adjustment by means of a pair of hydraulic elevating cylinders 45, 45 and tilting cylinders 40, in the manner similar to that previously employed with two-cutter head boring machines as disclosed in Patent No. 2,745,649, excepting that in the present machine the said elevating and tilting mechanism is disposed between the two branch conveyors 17 and 18 as seen in Figure 2. Since the elevating and tilting mechanism forms no part of the present invention further details need not be shown or described herein.

Referring now more particularly to the features of the machine which form the subject matter of the present invention, the four cutter heads 13, 14, 15 and 16 are rotatably supported in bearings contained in hubs 21, 22, 23 and 24, respectively, forming part of and projecting forwardly from the auxiliary frame 12. Said boring heads are all of substantially the same construction consisting, respectively, of main drive shaft 25, 26, 27 and 28, pairs of diametrically extending arms 29, 30, 31 and 32, with two forwardly projecting, bit-carrying cutter supports 33 and 34 on each arm. In the illustrative form shown herein, the outer ends of the arms of each boring head are hinged for forward collapsing movement, as is well known in the art. Further details of the construction of the cutter heads need not be described, excepting to note that each of the eight arms also has a scoop 35 fixed on its outer end in position to sweep loose material into position to be loaded into the open throats 36 and 37 of the two branch conveyors 17 and 18 disposed adjacent the mine floor.

As seen in Figure 2, the innermost boring heads 14 and 15 may project forward slightly more than the outermost boring heads 13 and 16 to stabilize the boring movement of the machine, and to provide a favorable entrance angle to the throats 36 and 37 by providing room into which the diverter means 46 and 47 can extend. The outermost cutter supports 34 of any two adjacent cutter heads are of such length that they move in partially overlapping paths to cut contiguous bores in the embodiment shown in Figures 1–3.

As will be further observed in Figure 1, the several boring heads normally rotate in alternate directions as indicated by the arrows, with their arms maintained at such angles to each other as to avoid any interference therebetween. For convenience, it may be considered that the two boring heads 13 and 14 on one side of the machine constitute a first pair of heads which rotate in opposite directions so that their respective arms and the scoops 35 carried thereby alternately move inwardly, adjacent the mine floor, to sweep loose material into loading position at a first conveyor throat 36 between said pair. The other boring heads 15 and 16, on the other side of the machine, may be considered as a second pair, similarly serving to sweep loose material into loading position at the second conveyor throat 37.

The two branch conveyors 17 and 18 extend upwardly and inwardly from their throats 36 and 37 to the central hopper 20. Said conveyors are of the conventional center chain flight type as shown in Figure 2, each having a drive motor 39 connected to a transverse drive shaft 38 at the upper end thereof.

The auxiliary frame 12 also has upper and lower trimmer bars 41 and 42 disposed in generally horizontal, tangential relation to the upper and lower limits of the bore patterns determined by the four boring heads, as seen in Figure 1. In the form shown herein, said bars are of the conventional cutter chain carrying type, each with an endless chain 42a moving in a guide around its bar, and passing around suitable fixed guides at opposite ends of said bar. The front edge of each bar with its cutter chain may be arched forwardly as shown, to maintain a substantially uniform distance rearwardly of the cutter heads, where the two center heads 14 and 15 are advanced slightly farther than the two end heads 13 and 16 as shown. The upper trimmer bar 41 is supported for vertical adjustment relative to the auxiliary frame by piston rods 43, 43, of upright hydraulic cylinders 44, 44 at opposite ends of said frame. The lower trimmer bar 42 may be similarly mounted for vertical adjustment relative to the frame if desired.

The drive gearing for the boring heads and the cutter-chains of the trimmer bars is contained and suitably journaled in a housing 12a forming part of the auxiliary frame 12 as illustrated diagrammatically in Figure 3. A double shaft extension motor 52 carrying hydraulic pump 88 and pinion 51 is face mounted on the rear of the auxiliary frame 12 (see Figure 2). Motor pinion 51 meshes with a gear 53 (see Figure 3) in the housing 12a. The gear 53 is rotatable with a pinion 54 which drives a gear 55 of the same diameter as the gear 53. Gear 55 rotates with a pinion 56 of the same diameter as the pinion 54. Pinion 56 drives a gear 57 with a pinion 58 rotating therewith. Pinion 58 drives a bull gear 26a, which rotates the shaft 26 of the boring head 14.

A series of idler gears 59, 60, 61 and 62 connect the bull gear 26a with the outermost bull gear 25a on the shaft 25 of boring head 13.

The pinion 54 also drives a gear 63 which is the same diameter as the adjacent gear 57 previously mentioned. Gear 63 has a pinion 64 rotating therewith which drives the bull gear 27a on shaft 27 of the cutter head 15. A series of idler gears 65, 66, 67 and 68 connect the bull gear 27a with the bull gear 28a on shaft 28 of the boring head 16.

With the drive gearing just described it will be understood that all four boring heads 13, 14, 15 and 16 are driven from the single motor 52 at the same speed and alternating in opposite directions, as indicated by the arrows in Figures 1 and 3.

A drive connection is also provided for the cutter chain 42a on upper and lower trimmer bars 41 and 42. In the form of drive shown herein the gear 55 also has a helical gear 70 rotating therewith which engages a helical gear 71 on a hollow upright shaft 72 approximately at the center of the machine. The hollow shaft 72 has splined connection at 73 with a shaft 74 extending to the upper trimmer bar 41 as seen in Figure 1. The shaft 74 has a chain sprocket 75 fixed at its upper end and rotating in a plane substantially coincident with the plane of orbital movement of the cutter chain 42a, but spaced forwardly of the rear reach of said chain, as seen in Figure 2. An intermediate drive chain 76 is trained around the sprocket 75 and idler sprockets 77 and 78 located closely adjacent to the inner face of the cutter chain 42a. The intermediate drive chain 76 has a plurality of outwardly projecting lugs 79 on its links, which lugs project into driving engagement between adjacent links of the cutter chain 42a for driving the latter.

A similar drive connection for the cutter chain on the lower trimmer bar 42 is provided, details of which need not be shown nor further described herein as it would merely duplicate the drive connection to the upper trimmer bar 41 just described.

Pusher plates 80 of arcuate form project from opposite sides of the auxiliary frame 12 at the rear of the outermost boring heads 13 and 16 and adjacent the mine floor. As usual the lower arcuate edges of said pusher plates conform approximately with the arcuate path of movement of the longer cutter arms of the outermost boring heads, to confine the cuttings within the bores, at opposite sides of the machine.

The use and operation of the machine is as follows:

The machine is advanced into the working face in the manner similar to that previously practiced with mining machines of the two boring head type, but in the present instance of a four boring head machine, the pair of boring heads at each side of the center of the machine, rotate in opposite directions to each other in overlapping relation so as to sweep the loose material or cuttings produced thereby along the front and toward the adjacent conveyor throat, which serves said pair of boring heads. At the same time, the innermost boring heads 14 and 15 of each pair also rotate in overlapping relation to each other and in opposite directions in such a manner that their respective arms 30 and 31 do not interfere with each other.

With two conveyor throats as thus described it is possible to use two cutter arms on each boring head with a scoop 35 on the end of each cutter arm, thus making a total of eight scoops continuously moving the coal toward one or the other conveyor throat. Thus eight scoops are employed to feed the conveyors whereas four such scoops is the maximum number which could be employed without interference if the four cutter heads were designed for use with a single central conveyor throat. Moreover, the two-throated type of machine herein disclosed greatly reduces the distance that loose material must be transferred by the scoops into position for loading into a conveyor throat. In other words, it eliminates the duplicate handling of loose material by two sets of scoops which otherwise would be necessary in a four-boring head machine having but a single centrally disposed conveyor throat and conveyor.

Figure 5:
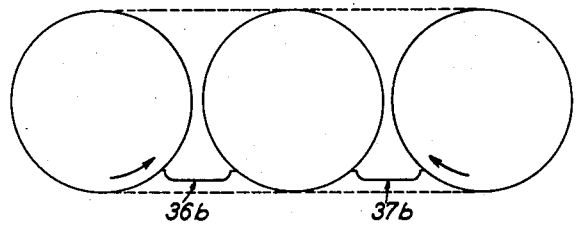
Figure 5 is a front view of the machine shown in Figure 4.

It is not intended that the foregoing description should limit the use of the invention to boring machines having four heads but could as well be used with multiple boring head mining machines having other numbers of boring heads. For example, a machine having three heads is shown in Figures 4 and 5 in which 36b and 37b designate respectively the two conveyor throats. Likewise 17b and 18b are two conveyors running from front to back of the machine, 10b is a main frame, 12b is an auxiliary frame carrying the motor 52b which drives the boring heads 101, 102 and 103, and 41b is an upper trimmer chain. In general, similar parts of machines shown in Figures 2 and 4 are the same or very similar.

I claim:

In a mobile boring type mining machine, a frame, four boring heads mounted on the frame for rotation about parallel axes disposed in a common horizontal plane, each of the boring heads having a plurality of boring arms of equal length, the two inner boring heads being arranged to cut overlapping bores, means on the frame defining a pair of cuttings receiving throats disposed one between an outer boring head and the adjacent inner boring head and the other between the other two boring heads, conveyor means on the frame having a pair of material receiving ends and a single material discharge end, said material receiving ends being disposed one in each said throat and adapted to move cuttings longitudinally rearwardly of the frame, means for rotating the two outer boring heads in opposite directions with their respective boring arms moving toward each other along the mine floor, a cutter bar mounted on the machine adjacent the mine floor and disposed generally tangentially of and extending between the bores cut by the two outer boring heads, a paddle at the outer end of each boring arm of each of the two inner boring heads for moving cuttings laterally of the axes of the two inner boring heads, and common means for rotating the two inner boring heads at equal angular velocities with their respective boring arms in out-of-phase relationship and in opposite directions such that the boring arms of the two inner boring heads move away from each other along the mine floor, whereby the paddles on the boring arms of the two inner boring heads divide the mass of cuttings which is between the two cuttings receiving throats and move portions of that mass of cuttings alternately in opposite directions toward each of the cuttings receiving throats.

References Cited in the file of this patent

UNITED STATES PATENTS

| | | |
|---|---|---|
| 504,180 | Stanley | Aug. 29, 1893 |
| 577,331 | Stanley | Feb. 16, 1897 |
| 1,603,621 | McKinlay | Oct. 19, 1926 |
| 2,080,181 | Miller | May 11, 1937 |
| 2,182,477 | Hollingsworth | Dec. 5, 1939 |
| 2,582,521 | Bataille | Jan. 15, 1952 |
| 2,705,624 | Robbins | Apr. 5, 1955 |

FOREIGN PATENTS

| | | |
|---|---|---|
| 60,237 | Germany | Jan. 9, 1892 |